(12) United States Patent
Barkalow et al.

(10) Patent No.: US 11,497,227 B2
(45) Date of Patent: Nov. 15, 2022

(54) CHEWY CONFECTION WITH REDUCED SUGAR

(71) Applicant: WM. WRIGLEY JR. COMPANY, Chicago, IL (US)

(72) Inventors: David Barkalow, Deerfield, IL (US); Andrea Haseleu, Essex (GB); Chia-Hua April Hsu, Glenview, IL (US); Niku Tseng, Chicago, IL (US)

(73) Assignee: WM. WRIGLEY JR. COMPANY, Chicago, IL (US)

( * ) Notice: Subject to any disclaimer, the term of this patent is extended or adjusted under 35 U.S.C. 154(b) by 288 days.

(21) Appl. No.: 16/337,161

(22) PCT Filed: Sep. 29, 2017

(86) PCT No.: PCT/US2017/054361
§ 371 (c)(1),
(2) Date: Mar. 27, 2019

(87) PCT Pub. No.: WO2018/064509
PCT Pub. Date: Apr. 5, 2018

(65) Prior Publication Data
US 2019/0223465 A1 Jul. 25, 2019

Related U.S. Application Data

(60) Provisional application No. 62/402,151, filed on Sep. 30, 2016.

(51) Int. Cl.
| | | |
|---|---|---|
| *A23G 3/50* | (2006.01) | |
| *A23G 3/34* | (2006.01) | |
| *A23G 3/42* | (2006.01) | |
| *A23G 3/44* | (2006.01) | |
| *A23G 3/40* | (2006.01) | |
| *A23G 3/38* | (2006.01) | |
| *A23G 3/48* | (2006.01) | |

(52) U.S. Cl.
CPC ............ *A23G 3/50* (2013.01); *A23G 3/0014* (2013.01); *A23G 3/38* (2013.01); *A23G 3/40* (2013.01); *A23G 3/42* (2013.01); *A23G 3/44* (2013.01); *A23G 3/48* (2013.01); *A23G 2200/06* (2013.01); *A23G 2200/14* (2013.01); *A23V 2002/00* (2013.01); *A23V 2200/132* (2013.01); *A23V 2200/228* (2013.01); *A23V 2200/3322* (2013.01); *A23V 2250/5028* (2013.01); *A23V 2250/5062* (2013.01); *A23V 2250/5114* (2013.01); *A23V 2250/5118* (2013.01); *A23V 2250/5432* (2013.01); *A23V 2250/6402* (2013.01); *A23V 2300/24* (2013.01)

(58) Field of Classification Search
CPC .......... A23G 3/50; A23G 3/0014; A23G 3/38; A23G 3/40; A23G 3/42; A23G 3/44; A23G 3/48; A23G 2200/06; A23G 2200/14; A23V 2002/00; A23V 2200/132; A23V 2200/228; A23V 2200/3322; A23V 2250/5028; A23V 2250/5062; A23V 2250/5114; A23V 2250/5118; A23V 2250/5432; A23V 2250/6402; A23V 2300/24
USPC ......................................... 426/548, 658, 660
See application file for complete search history.

(56) References Cited

U.S. PATENT DOCUMENTS

| | | |
|---|---|---|
| 2004/0086615 A1 | 5/2004 | Johnson et al. |
| 2007/0154592 A1 | 7/2007 | Bruno et al. |
| 2011/0159142 A1 | 6/2011 | Marin et al. |
| 2013/0108762 A1 | 5/2013 | Mo et al. |
| 2013/0309291 A1 | 11/2013 | Stoll |
| 2013/0309382 A1 | 11/2013 | Hsu et al. |
| 2015/0050411 A1 | 2/2015 | Stawski et al. |

FOREIGN PATENT DOCUMENTS

| | | |
|---|---|---|
| AU | 2015264877 A1 | 12/2015 |
| RU | 2262241 C2 | 10/2005 |
| WO | 0637319 A1 | 4/2006 |
| WO | 2008055510 A1 | 5/2008 |
| WO | 2008100851 A1 | 8/2008 |
| WO | 2008100854 A1 | 8/2008 |
| WO | 2012006215 A1 | 1/2012 |
| WO | 2012092255 A1 | 7/2012 |
| WO | 2012112515 A1 | 8/2012 |
| WO | 2013106363 A2 | 7/2013 |
| WO | 2016022629 A1 | 2/2016 |

OTHER PUBLICATIONS

Body Ecology, Erythritol What You Need to Know about This Natural Sugar Substitute & the Better Choice Available, Body Ecology, Apr. 18, 2008, 2 pages, NA.

*Primary Examiner* — Leslie A Wong

(57) ABSTRACT

Low cariogenic and low-laxation chewy confections comprising a non-cariogenic sweetener comprising erythritol and a doctoring agent comprising at least one of sucromalt, linear inulin, branched inulin, brown rice syrup, indigestible dextrin, polydextrose, isomaltooligosaccharide, and soluble corn fiber are provided. Methods for preparing low cariogenic and low-laxation chewy confections are also provided.

22 Claims, 7 Drawing Sheets

A

B

C

D

CHEWY CONFECTION WITH REDUCED SUGAR

This application is a 371 of PCT/US17/54361, filed Sep. 29, 2017. PCT/US17/54361 has priority to provisional application No. 62/402,151, filed Sep. 30, 2016.

BACKGROUND OF THE INVENTION

The field of the invention relates generally to chewy confections having reduced sugar.

Chewy confections typically comprise sucrose sweetener, corn syrup doctoring agent, a gelling agent, fat, color and flavor. Chewy confections are characterized by an elastic and somewhat firm texture during chewing. Typically, corn syrup and sucrose in a solids weight ratio of from about 1:1 to about 1.2:1 provides a stable balance that provides for a chewy confection having consumer acceptable texture, chewability, stability, sweetness, and flavor delivery. During chewing, the chewy confection generally maintains a coherent mass without breakage into smaller pieces that is characteristic of gelled confections and hard candies.

Problematically, sugar-based confections containing one or more sugars such as sucrose, maltose, fructose and dextrose promote dental caries (i.e., are cariogenic). Further, sugar-based confections may not be tolerated by consumers having type 1 or type 2 diabetes.

Efforts have been made to improve the healthiness of sugar-based confections by reducing the sugar content. One method of reducing sugar content is to shift the proportion of corn syrup doctoring agent to sugar in a confection formula, so that the gelled confection would contain less sugar. However, this option has limited usefulness because (i) corn syrup also contains various sugars, and (ii) a certain balance of doctoring agent to sugar may be necessary to produce a chewy confection that has a consumer acceptable texture, flavor delivery, sweetness and stability to cold flow.

Polyols such as sorbitol, maltitol, and isomalt have been used in an attempt to make healthier confections that are less cariogenic than traditional confections made with corn syrup and sucrose at a typical 1:1 to 1.2:1 solids weight ratio. Because those polyols are hygroscopic and are quick to crystallize from a concentrated solution state, a doctoring agent is required to make commercially acceptable textured confections that are at least as stable to cold flow and stickiness formation as gelled confections made with corn syrup and sucrose at a 1:1 to 1.2:1 solids weight ratio. A common doctoring agent is hydrogenated starch hydrolysate (HSH), which is a sugar-free syrup containing polyols of various sizes (mostly sorbitol and/or maltitol). Although, sorbitol, maltitol and isomalt sweeteners and doctoring agents are non-cariogenic and are less caloric than corn syrup combined with sucrose, problematically they may cause gastrointestinal disturbance (e.g., laxation).

Erythritol has been used as a sweetener in the preparation of hard confections and gelled confections. Due to the unique set of chewy confection characteristics and associated compositional and processing features, to-date erythritol has not been used as a sweetener in chewy confections. Chewy confections are characterized by a unique set of characteristics including adequate firmness for chewability, essential absence of stickiness, maintenance of a coherent mass without breaking into small pieces during chewing, smooth texture with the essential absence of graininess resulting from crystallized sweetener, and the essential absence of cold flow. Hard confections and gelled confections fundamentally differ from chewy confections in terms of at least hardness, texture, ratios of doctoring agent to sweetener, gelling agent, the absence of fat (which is present in chewy confections), and method of preparation. Gelled confections are characterized by a firm, but tender, sticky and pasty chew, where the gelled confection breaks into small pieces when chewing. Hard confections are friable and break into pieces when chewed.

A need therefore exists for chewy confections having reduced sugar content and that are less cariogenic than chewy confections known in the art.

BRIEF DESCRIPTION OF THE INVENTION

In some aspects, the present invention relates to a chewy confection composition. The chewy confections comprise (a) a non-cariogenic sweetener comprising erythritol; (b) a doctoring agent comprising at least one of sucromalt, linear inulin, branched inulin, brown rice syrup, reduced sugar glucose syrup, indigestible dextrin, polydextrose, isomaltooligosaccharide, and soluble corn fiber; (c) fat and (d) a gelling agent. The solids weight ratio of doctoring agent to erythritol is from about 1.3:1 to about 2.5:1.

In some aspects, the present invention relates to a process for preparing a chewy confection. The process comprises: (a) forming an admixture of a doctoring agent comprising at least one of sucromalt, linear inulin, branched inulin, brown rice syrup, indigestible dextrin, polydextrose, isomaltooligosaccharide, and soluble corn fiber, and a non-cariogenic sweetener comprising erythritol, wherein the solids weight ratio of doctoring agent to erythritol is from about 1.3:1 to about 2.5:1; (b) heating the admixture to a temperature of from about 265° F. to about 310° F.; (c) mixing the heated doctoring agent and non-cariogenic sweetener with fat, a gelling agent, erythritol seed crystals, and flavor to form a chewy confection admixture; and (d) forming the chewy confection admixture into the chewy confection.

DETAILED DESCRIPTION OF THE INVENTION

Figure 1:
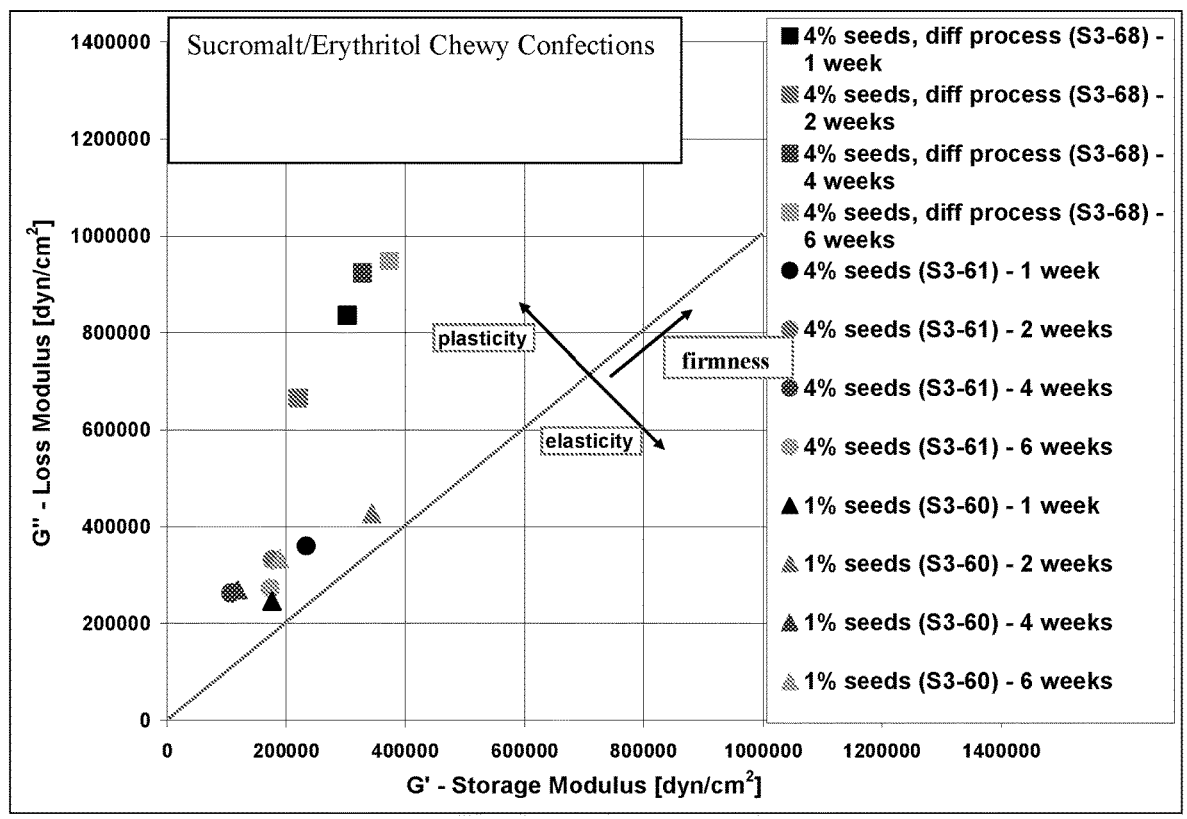
FIG. 1 is graph depicting the plasticity, elasticity and firmness of chewy confections of the present invention versus time.

The present invention relates to improved formulations for chewy confections containing a non-cariogenic sweetener comprising erythritol and a doctoring agent comprising at least one of sucromalt, linear inulin, branched inulin, brown rice syrup, indigestible dextrin, polydextrose, isomaltooligosaccharide, and soluble corn fiber, wherein the doctoring agent to non-cariogenic sweetener ratio of from about 1.3:1 to about 2.5:1 based on wt. % solids. The chewy confections of the present invention are advantageously less cariogenic than traditional corn syrup and sucrose chewy confections and do not cause gastrointestinal disturbances.

As used herein, chewy confectionery products refer to products comprising a doctoring agent, a non-cariogenic sweetener, a texturizing (gelling) agent and a fat. Chewy confectionery products are referred to as chewy candy, toffee or taffy, and have certain chew and rheological characteristics that distinguish them from hard confections and gelled confections. Commercially acceptable chewy confections have characteristic initial bite firmness, firmness during chewing, chewiness, stickiness (i.e., lack of significant sticking to the teeth), lack of graininess (i.e., lack of a grainy mouthfeel due to the predominant absence of large sugar crystals), and sweetness. These characteristics are typically measured by panels of tasters based on a rating scale. Evaluation by taste panels is particularly useful and instructive in comparative testing such as between a commercial chewy confection and an experimental chewy confection. Commercially acceptable chewy confections further have a non-sticky surface at typical storage conditions of temperature and humidity, both during and after processing, to allow for ease of packaging removal. Still further, commercially acceptable chewy confections do not exhibit cold flow and thereby provide a stable chewy confection at typical storage conditions of temperature and humidity, both during and after processing.

In contrast to chewy confections, gelled confections (candies) do not contain fat and are characterized by a firm, sticky and pasty chew. Typically, gelling starches such as amylose-containing varieties are used in gelled confections to produce a strong gel. Gelled confections typically do not retain a coherent mass when chewed and may break apart into smaller pieces. Chewy confections are not as firm as gelled confections and exhibit less stickiness than gelled confections. Further, chewy confections tend to remain as a coherent mass that dissolves during chewing, whereas gelled confections may break up into smaller pieces and dissolve at a slower rate. Examples of gelled confections include jelly bean centers, gum drops, orange slices, licorice, etc.

In contrast to chewy confections, hard confections do not contain fat, are friable and break into pieces when chewed, and dissolve slowly in the mouth. Examples of hard confections include lollipops and lozenges.

Non-cariogenic sweeteners of the present invention are selected from the group comprising erythritol, isomaltulose, trehalose, and combinations thereof.

In some aspects, the non-cariogenic sweetener comprises erythritol. In some aspects, the non-cariogenic sweetener predominantly comprises erythritol. As used herein, "predominantly comprising" (or "predominantly comprises") refers to a content of at least 50 wt. %, at least 75 wt. %, at least 90 wt. %, or at least 95 wt. %. In some other aspects, the non-cariogenic sweetener consists essentially of erythritol. Erythritol is a polyol with unusual characteristics for a polyol. The first two are recognized benefits: erythritol is non-cariogenic and natural. Two other unusual characteristics of erythritol are not normally considered benefits to confection production: low solubility and high rate of crystallization. Surprisingly, these last two characteristics need not prevent erythritol from being used to make consumer acceptable chewy confections. Erythritol is a four-carbon sugar alcohol. Erythritol is produced from glucose by fermentation with the yeast, *Moniliella pollinis*. Erythritol is absorbed into the bloodstream in the small intestine. Because erythritol is absorbed before it enters the large intestine, it does not normally cause the laxative effects that are often experienced with consumption of other polyols, such as sorbitol, maltitol, and isomalt. Erythritol cannot be metabolized by oral bacteria, so it does not contribute to tooth decay. Erythritol may be used to make chewy confections that are non-cariogenic and non-laxative. A challenge with erythritol is that its low water solubility limits initial syrup concentration. Another challenge with erythritol is that it crystallizes very quickly from a concentrated or supersaturated syrup. Because of these challenges, erythritol needs a suitable doctoring agent at a suitable proportion to control the crystallization so that a chewy confection can be produced that will be storage stable and have desired flow characteristics, and give consumers acceptable texture and flavor delivery. When erythritol crystallizes uncontrolled in chewy confections, the crystals can interfere with the gelling agent matrix and the texture will become firm or hard. Further, uncontrolled crystallization can create crystals large enough that they can be felt on the tongue as grit or grain and thereby result in unacceptable texture and mouthfeel. All of these characteristics are considered defects in traditional chewy confections, hence additional ingredients (i.e., doctoring agents) are necessary to deliver the acceptable gelled confection containing erythritol.

Isomaltulose (also called palatinose) is a reducing glucose-fructose disaccharide in which glucose and fructose are linked through their respective 1 and 6 carbon atoms. Isomaltulose commercially is produced enzymatically from sucrose. Isomaltulose is digested much slower than sucrose, and has a lower glycemic response than sucrose, making it acceptable to diabetics. Isomaltulose is further non-laxative and non-cariogenic.

Trehalose, also known as mycose or tremalose, is a natural alpha-linked disaccharide formed by an α,α-1,1-glucoside bond between two α-glucose units, giving it the name of α-D-glucopyranosyl-(1→1)-α-D-glucopyranoside Trehalose is non-laxative and non-cariogenic.

Doctoring agents of the present invention may suitably comprise at least one of sucromalt, inulin (linear or branched), brown rice syrup, indigestible dextrin, polydextrose, isomaltooligosaccharide, and soluble corn fiber. In some aspects, the doctoring agent comprises sucromalt. In some aspects the doctoring agent predominantly comprises sucromalt. In some aspects, the doctoring agent consists essentially of sucromalt.

Doctoring agents influence chewy confection stability during cooking and storage by affecting the water content in the confection. The water may be present due to lack of evaporation (i.e., removal) during cooking, or due to water absorption during storage. Excess water in a chewy confection that is not controlled by the gelling agent or the doctoring agent may start to dissolve the chewy confection contents. As a result, the chewy confection may deform and flow during storage (i.e., cold flow). The confection surface may also become sticky as uncontrolled water dissolves the sweetener on the outer surface of the confection. Further, excess water may cause the chewy confection texture to change to unacceptable soft and non-elastic. Doctoring agents additionally influence chewy confection stability during storage by keeping moisture in the gelled confection during storage at low humidity conditions. A reduction of moisture in a gelled confection could negatively change confection texture from firm to hard and from elastic to inelastic.

A stable chewy confection exists when there is a balance between sweeteners and doctoring agents. High levels of doctoring agent may prevent the crystallization of the sweetener by interfering with sweetener crystal formation. Too high a level of doctoring agent may cause its own defects by creating a too soft and/or sticky texture, due to the doctoring agent interfering with gelling strand contacting and/or the doctoring agent absorbing too much water from the environment.

Sucromalt (available under the trade name of XTEND® sucromalt from Cargill) is a mixture of carbohydrates produced by reacting sucrose and maltose utilizing an enzyme alternansucrase. Sucromalt is a mixture of fructose, leucrose, and oligosaccharides containing $\alpha$-(1-3), $\alpha$-(1-4) and $\alpha$-(1-6) glycosidic linkages with a degree of polymerization less than 12. The final product contains fructose (35-45 wt. % solids), leucrose (7-15 wt. % solids), saccharides with low degrees of polymerization (<5 wt. % solids), higher saccharides and polymer (>40 wt. % solids), and moisture (<30 wt. % solids). Sucromalt does not cause gastrointestinal distress. In some aspects, sucromalt contains fructose (37 wt. % solids), leucrose (13 wt. % solids), other DP2 saccharides (2 wt. % solids), and higher saccharides (48 wt. % solids).

Inulin is a group of oligosaccharides occurring naturally in many plants and belongs to a class of carbohydrates called fructans. Inulin is a prebiotic fermentable fiber and is metabolized by gut flora yields short chain fatty acids, which are reported to increase absorption of calcium, magnesium, and iron. Inulin also promotes an increase in the mass and health of intestinal *Lactobacillus* and *Bifidobacterium* populations. Inulin is composed of linear chains of fructose units linked by $\beta$ (2→1) bonds and is often terminated by a glucose unit. Inulin sources contain polymers in a distribution of chain lengths, which are described by their DP (number of sugar units). Typically, inulin is a material in a long linear chain form. A branched inulin (also called phlein), such as BioAgave™, supplied by GTC Nutrition, is a long chain inulin that has a high degree of polymerization. Inulin has a minimal impact on blood sugar and does not raise blood triglycerides, making it generally considered suitable for diabetics. In some aspects, the branched inulin contains glucose, sucrose, and fructose (10 wt. % solids), and branched fructan (90 wt. % solids). Branched inulin has the benefits of linear inulin discussed above, though its branched structure allows it to perform differently than linear inulin in chewy confections. For example, branched inulin works better as a doctoring agent than linear inulin due to the branched structure being more flexible than that of linear inulin. Also, branched inulin, because of its structure, can control more water than linear inulin. The branched inulin appears to be more compatible with gelling agents than linear inulin.

Brown rice syrup is produced by combining crushed brown rice, water, and food grade enzymes (all natural ingredients). When the rice starch has been hydrolyzed to the appropriate level, the mass is evaporated. In some aspects, the brown rice syrup contains dextrose (19 wt. % solids), maltose (14 wt. % solids), trisaccharide (12 wt. % solids), and higher saccharides (55 wt. % solids).

Indigestible dextrin is a group of low molecular weight carbohydrates produced by hydrolysis of starch by acid in a roasting process. These dextrins are mixtures of $\alpha$-(1→4)-linked D-glucose polymers starting with an $\alpha$-(1→6) bond, which are then treated with additional roasting to create branched carbohydrates or pyrodextrins. The dextrins are further treated with enzymes to make them highly branched and virtually indigestible. Indigestible dextrins are non-cariogenic and do not cause gastrointestinal disturbances at the levels of used in chewy confections.

Polydextrose is a soluble, random polymer of dextrose containing minor (less than about 10 wt. %) amounts of sorbitol (at least 2 wt. %) and citric acid. Typical polydextrose polymers contain around 10 to 50 saccharide units, preferably 20 to 40 saccharide units.

Reduced sugar glucose syrups are made from other starch sources such as potato, wheat, barley, rice and tapioca (cassava). Some examples of commercially available reduced sugar glucose syrups include but are not limited to Multivantage Syrup (from Tate and Lyle), Sucromalt (from Cargill), Versyra (from Cargill). In general, Sucromalt has similar sugars content as corn syrup but contains sugars with a lower glycemic content (i.e., fructose, leucrose, etc). Multivantage Syrup ("MVS") generally has less sugars (~14% vs. the 40-50% in regular corn syrup).

The ratio of doctoring agent to sweetener affects the chewy texture of the confections of the present invention. In the case of erythritol, it is believed that excessive erythritol results in uncontrolled crystallization and grainy texture. The selection of a ratio of doctoring agent to erythritol that provides for desired chewy confection texture, flavor delivery, sweetness and flow relates to a number of factors unique to chewy confections, including the gelling agent and concentration thereof, seed crystal concentration, fat concentration, water concentration, and processing conditions. In any of the various aspects of the invention, the solids weight ratio of doctoring agent to non-cariogenic sweetener (e.g., erythritol) is from about 1.3:1 to about 2.5:1, from about 1.5:1 to about 2.2:1, from about 1.6:1 to about 2:1, from about 1.5:1 to about 1.9:1, or between 1.5:1 and 1.85:1.

The chewy confections comprise from about 75 wt. % to about 90 wt. % doctoring agent and non-cariogenic sweetener solids and from about 5 wt. % to about 9 wt. % water, or from about 75 wt. % to about 85 wt. % doctoring agent and non-cariogenic sweetener solids and from about 5 wt. % to about 9 wt. % water. In some particular aspects, the confections comprise about 80 wt. % doctoring agent and non-cariogenic sweetener solids.

The chewy confections comprise from about 70 wt. % solids, about 80 wt. % solids, about 85 wt. % solids, about 90 wt. % solids, about 95 wt. % solids or about 97 wt. % solids, and ranges thereof, such as from about 70 wt. % to about 97 wt. % solids, from about 75 wt. % to about 97 wt. % solids, or from about 80 wt. % to about 97 wt. % solids.

The chewy confections further comprise a texturizing (gelling) agent. Non-limiting examples of gelling agents include starch, gelatin, dextrin, gum Arabic, peptin, hydrocolloids, and combinations thereof. In some aspects, the gelling agent comprises starch, gelatin and dextrin. In some other aspects, the gelling agent comprises gelatin and gum Arabic. In some other aspects, the chewy confections comprise from about 2 wt. % to about 6 wt. % solids gelling agent, from about 2 wt. % to about 5 wt. % solids gelling agent, or from about 2 wt. % to about 4 wt. % solids gelling agent on a confection wet basis. In some particular aspects, the chewy confections comprise about 3 wt. % solids gelling agent.

The chewy confections further comprise fat. Fat contributes to the texture and mouthfeel characteristic of chewy confections as compared to hard confections and gelled confections. Fat also reduces chewy confection cold flow. Without being bound to any particular theory, it is believed that fat improves cold flow because the fat discontinuous phase interrupts the sweetener/doctoring agent continuous phase. The fat may include, but is not limited to, any number of fats commonly used in confectionery products. Non-limiting examples of fats include dairy fats, modified and unmodified palm oil, palm kernel oil, coconut oil, soybean oil, and cottonseed oil. The chewy confections comprise from about 0.5 wt. % to about 20 wt. % fat, or from about 2 wt. % to about 8 wt. % fat on a chewy confection wet basis. In some aspects, the fat content is about 2 wt. %, about 4 wt. %, about 6 wt. % or about 8 wt. %. In some particular aspects, the chewy confection comprises about 8 wt. % fat.

Seed crystals (e.g., erythritol seed crystals) are added during chewy confection processing to control crystallization and reduce graininess. Without being bound to any particular theory, it is believed that seeding improves cold flow because more crystalline discontinuous phase is introduced to the chewy confection matrix and interrupts the sweetener/doctoring agent continuous phase. The chewy confections comprise from about 0.5 wt. % to about 6 wt. % seed crystals, or from about 1 wt. % to about 4 wt. % seed crystals on a chewy confection wet basis. In some aspects, the seed crystal content is about 1 wt. %, about 2 wt. %, about 3 wt. % or about 4 wt. %. In some particular aspects, the chewy confection comprises about 4 wt. % seed crystals.

Chewy confectionery products may further include one or more of water, foaming agents, humectants, artificial and natural sweeteners, emulsifiers, flavor enhancers, acids, essential oils, artificial or natural flavorings, colorings, fruit juices, vegetable juices, proteins, acidulents, and other additives typically used in the production of chewy confectionery products as desired. Examples of flavors include essential oils, synthetic flavors, or mixtures including but not limited to oils derived from plants and fruits such as citrus oils, fruit essences, peppermint oil, spearmint oil, clove oil, oil of wintergreen, anise and the like. Artificial flavoring components are also contemplated for use in the confectionery product. Those skilled in the art will recognize that natural and artificial flavoring agents may be combined in any sensorially acceptable blend. Examples of colors include FD&C lakes and dyes and some natural colors. Other natural colors include colors such as chlorophyll, curcumin, caramel, carmine, annatto, and other similar types of colors. An example of an acidulent is citric acid.

The moisture content of the chewy confections is from about 5 wt. % to about 9 wt. %, or from about 6 wt. % to about 8 wt. %. In some aspects, the water content is about 6 wt. %, about 6.25 wt. %, about 6.5 wt. %, about 6.75 wt. %, about 7 wt. %, about 7.25 wt. % or about 7.5 wt. % as measured by the Karl Fischer method. The water activity of the chewy confections is no more than 1 or no more than 0.6, such as 0.6, 0.5, 0.4, 0.3 or 0.2 as measured by a Rotronic Hygrolab.

The hardness of the chewy confections as measured by a textural analyzer is from about 0.5 kg to about 1.7 kg, from about 0.75 kg to about 1.6 kg, from about 1 kg to about 1.6 kg, or from about 1.2 kg to about 1.6 kg. In some aspects, the hardness is about 1 kg, about 1.2 kg, about 1.4 kg, or about 1.6 kg.

In some aspects, the chewy confection compositions of the present invention have a chewiness rated higher for a "just about right" criterion at a 80% confidence interval than a comparative chewy confection composition having from about 80 wt. % to about 85 wt. % of the combination of a sucrose sweetener and a corn syrup doctoring agent, wherein the solids weight ratio of corn syrup to sucrose is 1:1, and wherein the rating is done by a panel of consumers evaluating the chewy confection compositions in a blind and random order.

In some aspects, the chewy confection compositions of the present invention have a texture rated higher for a "just about right" criterion at a 95% confidence interval than a comparative chewy confection composition having from about 80 wt. % to about 85 wt. % of the combination of a sucrose sweetener and a corn syrup doctoring agent, wherein the solids weight ratio of corn syrup to sucrose is 1:1, and wherein the rating is done by a panel of consumers evaluating the chewy confection compositions in a blind and random order.

In some aspects, the chewy confection compositions of the present invention have a sweetness rated similarly for a "just about right" criterion at a 95% confidence interval than a comparative chewy confection having from about 80 wt. % to about 85 wt. % of the combination of a sucrose sweetener and a corn syrup doctoring agent, wherein the solids weight ratio of corn syrup to sucrose is 1:1, and wherein the rating is done by a panel of consumers evaluating the chewy confection compositions in a blind and random order.

In some aspects, the chewy confection compositions of the present invention have a flavor rated higher for a "just about right" criterion at a 95% confidence interval than a comparative chewy confection composition having from about 80 wt. % to about 85 wt. % of the combination of a sucrose sweetener and a corn syrup doctoring agent, wherein the solids weight ratio of corn syrup to sucrose is 1:1, and wherein the rating is done by a panel of consumers evaluating the chewy confection compositions in a blind and random order.

In some aspects, the chewy confection compositions of the present invention have an overall liking rated higher at a 95% confidence interval than a comparative chewy confection composition having from about 80 wt. % to about 85 wt. % of the combination of a sucrose sweetener and a corn syrup doctoring agent wherein the solids weight ratio of corn syrup to sucrose is 1:1, wherein the rating is done by a panel of consumers evaluating the chewy confection compositions in a blind and random order.

The chewy confections are prepared in a multi-step process, using processing techniques generally known in the art.

In one such process, in a toffee cooking step, the doctoring agent (e.g., sucromalt) and erythritol sweetener are heated with mixing to form a cooked syrup. Cooking drives water from the syrup and cooking temperature impacts the moisture content of the finished chewy confection. Cooking is one factor that affects chewy texture. Higher cooking temperatures result in comparably lower chewy confection moisture content as compared to lower cooking temperatures. In general, texture (hardness) and degree of cold flow vary inversely with moisture where a chewy confection with lower moisture will tend to be harder and exhibit reduced cold flow as compared to a similarly formulated chewy confection differing only with respect to a lower cooking temperature and higher moisture. The cooking temperature is from about 265° F. to about 310° F., from about 270° F. to about 300° F., or from about 275° F. to about 290° F. In some aspects, the temperature is about 275° F., about 280° F., about 285° F., about 290° F., about 295° F., or about 300° F. In one aspect, the temperature is about 290° F.

Various pre-blend steps may be done. In a fat preblend step, fats as described elsewhere herein are combined with mixing at a temperature where all of the fat components are liquid, such as, for instance, from about 100° F. to about 125° F. for the combination of vegetable fat and lecithin. In a gelling agent preblend step, gelling agents as described elsewhere herein are combined with mixing and heating, for instance, gelatin, dextrin and starch may be suitably combined at a temperature of about 140° F. In a color preblend step, water, juice and color may are combined with mixing and heating. In a seed preblend step, solid erythritol is combined with water with mixing and heating. The ratio of water to erythritol and temperature are selected such that the erythritol predominantly remains in the form of a solid.

The chewy confection admixture composition is prepared in a toffee mixing step wherein cooked doctoring agent/erythritol syrup is combined in a mixer with the fat preblend, gelling agent preblend, juice/color preblend and seeding preblend. Other components such as flavors and acidulents may be added in the toffee mixing step. In some aspects, the gelling agent preblend, juice/color preblend and seeding preblend combined in the mixer followed by addition of the cooked doctoring agent/erythritol syrup and low speed mixing for from 1 to 5 minutes. Thereafter, flavor, fat preblend and acidulent may be added and mixed to form the chewy confection admixture.

The chewy confection admixture composition in then formed into the chewy confection. In some such aspects, the chewy confection composition is cooled, such as on a toffee cooling table; the cooled chewy confection composition is then pulled and further cooled, such as on a pulling table; and finished chewy confections are then prepared by rolling and cutting.

EXAMPLES

Example 1

Chewy confections comprising sucromalt, erythritol, fat, erythritol seed crystals, color, flavor and citric acid were prepared and evaluated rheologically for texture. The compositions are reported in Table 1 below where the concentrations are in weight percent.

TABLE 1

|  | Formulation | | |
| --- | --- | --- | --- |
|  | S3-60 | S3-61 | S3-68 |
| Structuring Agent | 5.45% | 5.45% | 5.45% |
| Sucromalt/Erythritol Syrup | 83.31% | 80.31% | 80.31% |
| Fat | 8.05% | 8.05% | 8.05% |
| Erythritol Seed | 1% | 4% | 4% |
| Color/Juice Blend | 0.8% | 0.8% | 0.8% |
| Strawberry Flavor | 0.14% | 0.14% | 0.14% |
| Citric Acid | 1.25% | 1.25% | 1.25% |

The structuring agent for formulations 5360 and S3-61 was starch jelly. The starch jelly contained 10.87% dextrin, 4.86% instant modified starch, 18.12% corn syrup (42DE), 16.07% sucrose, 8.1% gelatin (Gelatin 215 bloom bovine), and the balance water. The structuring agent for formulation S3-68 comprised 98.45% gelatin (PK 200), 1.03 wt. % gum Arabic, and water as the balance.

The sucromalt/erythritol syrup contained a weight ratio on a solids basis of sucromalt to erythritol of between 1.5:1 and 1.85:1.

The fat contained 98.45% palm kernel oil and 0.52% lecithin.

The erythritol seed crystal particle size was characterized as 80-100% retained on a 60 mesh screen.

The confections were prepared by heating (cooking) the sucromalt/erythritol syrup to 290° F. (143.3° C.). The starch jelly, color/juice blend, erythritol seed, sucromalt/erythritol syrup, flavor, fat and citric acid were added to a mixer and admixed to form a toffee. The toffee was cooled on a cooling table, pulled on a pulling table, and rolled to a thickness of about 10 mm. The rolled toffee was cut to size to form the finished chewy confection.

The texture of the chewy confections was evaluated rheologically through small amplitude oscillatory shear frequency sweep during a six-week aging period at 23° C. and 50% relative humidity, and the results are depicted in FIG. 1. The data show that the texture for the sucromalt/erythritol confections was generally stable over the evaluation period. The water content of the chewy confections was evaluated during the six-week aging period, and the results are reported below in Table 2.

TABLE 2

| Moisture (%) | S3-68 | S3-61 | S3-60 |
| --- | --- | --- | --- |
| 1 week | 5.61 | 6 | 6.12 |
| 2 weeks | 5.67 | 6.1 | 6.38 |
| 4 weeks | 5.96 | 6.45 | 6.56 |
| 6 weeks | 5.67 | 5.98 | 5.99 |

Figure 2:
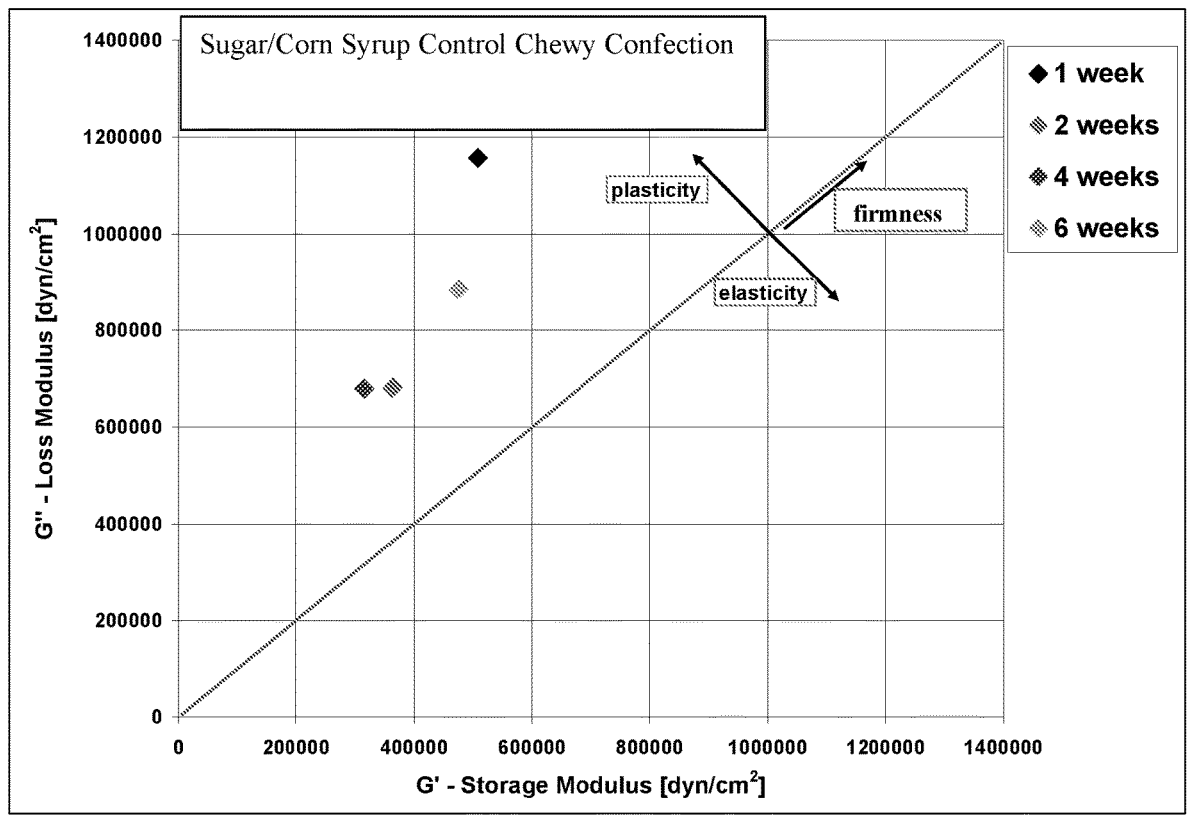
FIG. 2 is a graph depicting the plasticity, elasticity and firmness of a prior art chewy confection containing sucrose sweetener and corn syrup doctoring agent.

A comparative chewy commercial confection was evaluated rheologically as a control. The control confection differed from the sucromalt/erythritol confections of Table 1 with respect to sucrose sweetener and corn syrup doctoring agent in about a 1:1 ratio and about 0.5 wt. % sucrose seed crystals. The control confection was evaluated rheologically for texture during a six-week aging period at 23° C. and 50% relative humidity, and the results are depicted in FIG. 2. A textural change was observed for the control over the six week period. The moisture content of the control confection was 6.93% (1 week), 6.88% (2 weeks), 7.02% (4 weeks) and 6.88% (6 weeks).

Example 2

Chewy confections comprising varying ratios of sucromalt to erythritol were prepared and evaluated for texture, sweetness and flavor against two control chewy confections comprising sucrose and corn syrup and one control chewy composition comprising erythritol and corn syrup. The composition each of the six chewy confections is summarized in Table 3 below.

TABLE 3

| Composition/Component | 2-1 | 2-2 | 2-3 | Control 1 | Control 2 | Control 3 |
|---|---|---|---|---|---|---|
| Sucromalt/Erythritol | 1:1 ratio | Ratio between 1.5:1 and 2.2:1 | 3:1 ratio | — | — | — |
| Sucrose/Corn Syrup | — | — | — | 1:1 ratio | 1:1 ratio | — |
| Erythritol/Corn Syrup | — | — | — | — | — | 1:1 ratio |
| Fat | 8% | 8% | 8% | 8% | 8% | 8% |
| Seed | 4% | 4% | 4% | 4% | 4% | 4% |
| Cooking Temperature | 290° F. | 290° F. | 290° F. | 290° F. | 275° F. | 275° F. |

The compositions were prepared as described in Example 1 (with cooking at 290° F. or 275° F.). Each composition contained from about 80% to about 83% sweetener (erythritol or sugar) and doctoring agent (sucromalt or corn syrup), and similar amounts of starch jelly, flavor, color/juice and citric acid.

Figure 3:
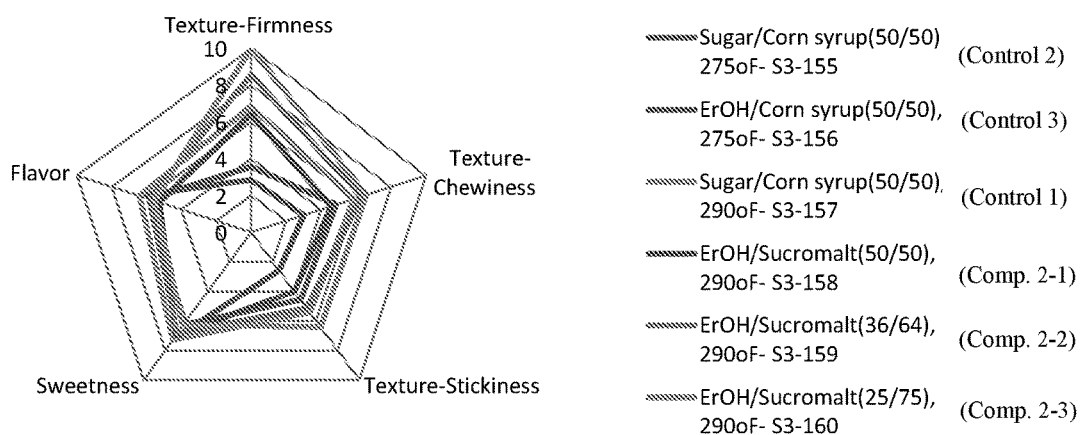
FIG. 3 is a graph depicting the firmness texture, chewiness texture, stickiness texture, sweetness and flavor for three chewy confection compositions of the present invention comprising erythritol (ErOH) and sucromalt (Comp 2-1, 2-2 and 2-3) as compared to two prior art chewy confection compositions comprising sugar and corn syrup (Control 1 and Control 2) and as compared to a composition comprising erythritol and corn syrup (Control 3).

The compositions were evaluated by a trained group of 6 to 8 panelists on a 1 to 10 point scale for texture-firmness, texture-chewiness, texture-stickiness, sweetness and flavor. The result averages are presented FIG. 3 and are disclosed Table 4 below.

TABLE 4

| Composition | Texture-Firmness | Texture-Chewiness | Texture-Stickiness | Sweetness | Flavor |
|---|---|---|---|---|---|
| 2-1 | 6.4 | 4.6 | 4 | 7.1 | 5.2 |
| 2-2 | 8.6 | 6.3 | 5.1 | 6.9 | 5.9 |
| 2-3 | 10 | 6.6 | 6.4 | 6.3 | 5.6 |
| Control 1 | 6.9 | 5.9 | 5.4 | 7.3 | 6.4 |
| Control 2 | 3.6 | 4.9 | 4.6 | 7.1 | 5.9 |
| Control 3 | 2.9 | 3 | 2.6 | 7.3 | 6.5 |

The compositions were analyzed for moisture content, water activity, and hardness. The Results are presented in Table 5 below where hardness is reported in kg.

TABLE 5

| Composition | Moisture | Water Activity | Hardness |
|---|---|---|---|
| 2-1 | 6% | 0.4 | 0.72 |
| 2-2 | 6.4% | 0.4 | 1.4 |
| 2-3 | 6.6% | 0.3 | 1.75 |
| Control 1 | 6.3% | 0.4 | 1.24 |
| Control 2 | 7.7% | 0.5 | 0.25 |
| Control 3 | 7.5% | 0.5 | 0.1 |

Example 3

Chewy confection 2-2 was evaluated in consumer testing versus a control chewy commercial confection as described in Example 1. The descriptive analysis, central location test, blinded, non-branded testing was done with N=82 consumers in a blind and random order on point scales of 1 to 5 and 1 to 10 (for liking). The results are reported in Table 6 below where statistically significant results at 95% c.I. is indicated in uppercase letters and 80% c.I. is indicated in lowercase letters.

TABLE 6

| Evaluation | Confection 2-2 | | Control | |
|---|---|---|---|---|
| Initial Bite Firmness | 3.72 | BCE | 1.28 | |
| Flavor Level | 3.12 | ABCe | 2.94 | AbC |
| Flavor Just About Right | 2.90 | AbCE | 2.72 | a |
| Just About Right | 77 | ABCE | 65 | ac |
| Too Much | 9 | | 6 | |
| Too Little | 15 | | 29 | D |
| Sweetness Level | 3.13 | AbC | 3.15 | AbC |
| Sweetness Just About Right | 3.00 | ABC | 3.01 | ABC |
| Just About Right | 71 | | 72 | bc |
| Too Much | 15 | ab | 15 | ab |
| Too Little | 15 | | 13 | |
| Tartness Level | 2.76 | ABCE | 2.40 | |
| Tartness Just About Right | 3.02 | AbCE | 2.63 | |
| Just About Right | 61 | c | 55 | |
| Too Much | 21 | AcE | 9 | |
| Too Little | 18 | | 37 | BD |
| Texture Just About Right | 3.32 | bCE | 1.59 | |
| Just About Right | 65 | AbcE | 12 | D |
| Too Firm | 30 | CE | 0 | A |
| Too Soft | 5 | aE | 88 | ABCD |
| Chewiness Just About Right | 2.91 | e | 2.68 | |
| Just About Right | 73 | ABCE | 22 | D |
| Too Much Chewiness | 10 | | 29 | D |
| Too Little Chewiness | 17 | | 49 | ABCD |
| Firmness | 3.30 | bCE | 1.26 | |
| Sticks to Teeth | 1.85 | | 2.35 | D |
| Overall Liking | 7.45 | ABCE | 5.9 | A |
| Flavor Liking | 7.54 | ABCE | 6.90 | AC |
| Sweetness Liking | 7.15 | ABCE | 6.72 | a |
| Texture Liking | 7.21 | ABCE | 4.71 | |
| Meeting Expectations | 3.95 | ABCE | 2.94 | a |
| Top 2 | 74 | ABCE | 40 | a |
| Bottom 2 | 12 | | 43 | BD |
| Aftertaste | 1.38 | | 1.52 | aBcD |
| No % | 38 | | 52 | aBcD |
| Yes % | 62 | E | 48 | |
| Aftertaste Pleasantness | 1.20 | e | 1.13 | |
| No % | 20 | e | 13 | |
| Yes % | 80 | ace | 87 | |
| Purchase Intent | 3.79 | ABCE | 2.77 | a |
| Top 2 | 71 | ABCE | 33 | a |
| Bottom 2 | 11 | | 44 | bD |

The data show that chewy confection 2-2 (containing sucromalt and erythritol) was rated significantly higher than the control at 95% c.I.

Example 4

Figure 4:
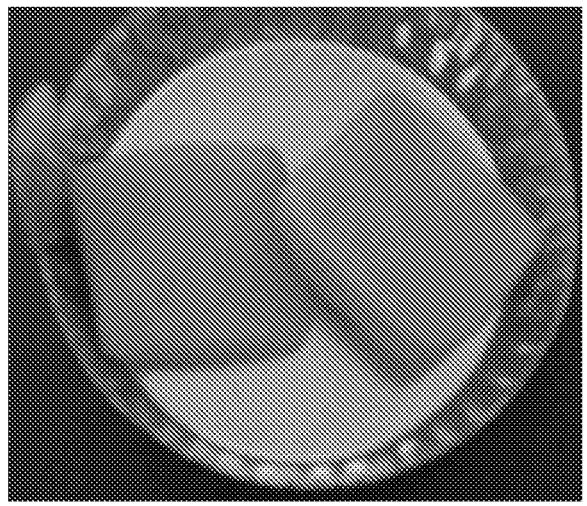
FIG. 4 depicts the lack of cold flow associated with two chewy confections of the present invention (FIGS. 4A and 4B) as compared to chewy confections that do not provide adequate cold flow characteristics (FIGS. 4C and 4D).
Figure 4:
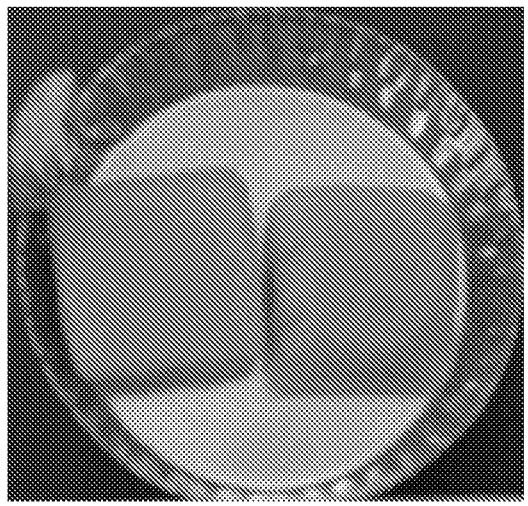
Figure 4:
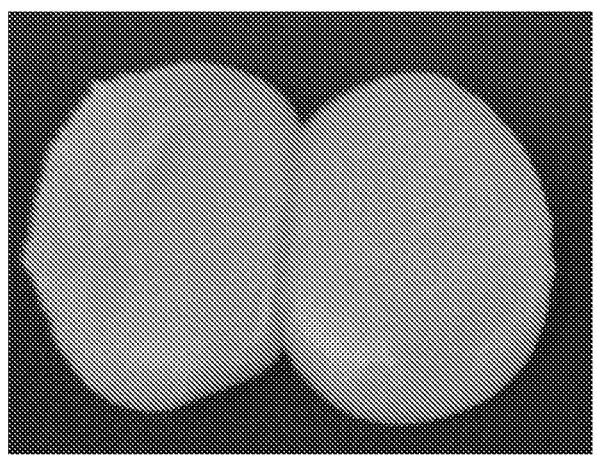
Figure 4:
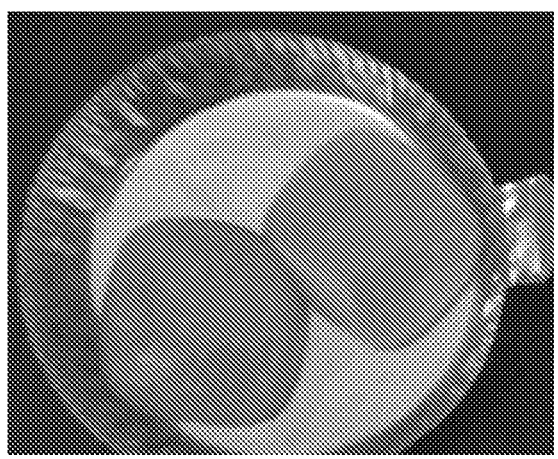

A composition generally conforming to chewy confection 2-2 was prepared according to the method described in Example 1, but the cooking temperature was 300° F. Central location, blinded, non-branded, descriptive testing for chewy confection 2-2 (cooked at 300° F.) was evaluated with consumers versus a control chewy commercial confection by the testing method described in Example 3. The evaluation was done with N=80 consumers in a blind and random order. The results are reported in Table 7 below, where statistically significant results at 95% c.I. are indicated in uppercase letters.

depicted in FIG. 4B. FIGS. 4A and 4B each depict the general absence of cold flow. FIGS. 4C and 4D depict chewy confections exhibiting cold flow.

TABLE 8

| | Formulation | | | | | |
|---|---|---|---|---|---|---|
| | 167A** | 168A | 167B* | 168B | 170A | 170B |
| Structuring Agent | 5.48% | 5.48 | 5.49% | 5.49% | 5.49% | 5.49% |
| Corn Syrup/Sugar Syrup | 81.7% | 75.7% | — | — | — | — |
| Reduced sugar syrup/Erythritol Syrup | — | — | 80.62% | 75.62% | 80.61% | 80.61% |
| Fat | 7.34% | 7.34% | 7.34% | 7.34% | 7.34% | 7.34% |
| Sugar Seeding | 4.0% | 5.0% | — | — | — | — |
| Erythritol Seeding | — | — | 5.0% | 5.0% | 5.0% | 5.0% |
| Color | 0.05% | — | 0.05% | — | 0.05% | 0.05% |
| Flavor | 0.18% | 0.25% | 0.18% | 0.25% | 0.18% | 0.18% |
| Reb-A | — | — | 0.085% | 0.082% | 0.084% | 0.084% |
| Acid | 1.25% | — | 1.25% | — | 1.25% | 1.25% |
| Salt | — | 0.24% | — | 0.24% | — | — |
| Sweetened Condensed Milk | — | 6.0% | — | 6.0% | — | — |
| TOTAL | 100.0% | 100.0% | 100.0% | 100.0% | 100.0% | 100.0% |

*Reduced sugar syrup refers to Sucromalt
**Reduced sugar syrup refers to Multivantage Syrup ("MVS")

TABLE 7

| | Control | Confection 2-2 (300° F.) | | LSD = 95% |
|---|---|---|---|---|
| While Chewing | | | | |
| Initial Bite Firmness | 2.69 | 3.49 | A | 0.21 |
| Flavor Level | 2.8 | 2.88 | | 0.2 |
| Sweetness Level | 3.05 | 3.04 | | 0.18 |
| Tartness Level | 2.28 | 2.44 | | 0.18 |
| Texture Just About Right | | | | |
| Too/somewhat firm | 0 | 33 | A | |
| Just about right | 75 B | 61 | | |
| Too/somewhat soft | 26 | 6 | | |
| Chewiness | 3 | 3.14 | | 0.14 |
| Firmness | 2.49 | 3.08 | A | 0.22 |
| Sticks to Teeth | 2.43 | 2.3 | | 0.18 |
| After Chewing | | | | |
| Overall Liking | 7.96 B | 7.36 | | 0.29 |
| Flavor Liking | 7.96 B | 7.1 | | 0.32 |
| Sweetness Liking | 7.81 B | 7.2 | | 0.32 |
| Texture Liking | 7.58 B | 7.1 | | 0.32 |
| Meeting Expectations | 4.35 B | 3.91 | | 0.25 |
| Top 2 | 84 | 74 | | |
| Bottom 2 | 5 | 18 | A | |
| Aftertaste | 1.53 B | 1.41 | | 0.09 |
| % (No) | 53 | 41 | | |
| % (Yes) | 48 | 59 | | |
| Purchase Intent | 4.34 B | 3.86 | | 0.22 |
| Top 2 | 86 B | 64 | | |
| Bottom 2 | 3 | 9 | A | |

Example 5

Compositions generally corresponding to chewy confection 2-2 were prepared by heating to 290° F. were processed in Z-blade and Hobart mixers, and were cooled, pulled, rolled and cut to size. The chewy confections were evaluated for cold flow by visual observation. Chewy confections processed in the Z-blade mixer are depicted in FIG. 4A and chewy confections processed in the Hobart mixer are depicted in FIG. 4B. FIGS. 4A and 4B each depict the general absence of cold flow. FIGS. 4C and 4D depict chewy confections exhibiting cold flow.

Example 6

The structuring agent for formulations 167A, 168A, 167B, 168B, 170A, and 170B was starch jelly. The starch jelly contained 10.9% dextrin, 4.9% instant modified starch, 18.1% corn syrup (42DE), 16.1% sucrose, 8.1% gelatin (Gelatin 200 bloom bovine), and the balance water.

The corn syrup/sugar syrup contained a weight ratio on a solids basis of corn syrup to sugar of 1.16:1. The reduced sugar syrup/erythritol syrup contained a weight ratio on a solids basis of sucromalt to erythritol of between 1.2:1 and 3.0:1.

The fat contained 95.4% palm kernel oil, 2.3% medium chain triglycerides, and 2.3% lecithin.

The erythritol seed crystal particle size was characterized as 80-100% retained on a 60 mesh screen.

Composition 167A is the control to 167B, 170A, and 170B; 168A is the control to 168B. The samples corresponding to chewy confection controls 167A and 168A were prepared by heating (cooking) the corn syrup/sugar mixture until target weights were reached corresponding to 9.2% moisture for 167A and 7.3% moisture for 168A. The starch jelly, color (where used), seeding, cooked syrup, flavor, fat, and citric acid or sweetened condensed milk and salt were added to a mixer and admixed to form a toffee. The toffee was cooled on a cooling table, pulled on a pulling table, and rolled to a thickness of about 10 mm. The rolled toffee was cut to size to form the finished chewy confection.

Compositions generally corresponding to chewy confection 167B, 168B, 170A and 170B were prepared by heating (cooking) the reduced sugar corn syrup/erythritol mixture until target weights were reached corresponding to 12.4% moisture for 167B, 170A, and 170B and 8.6% moisture for 168B. The starch jelly, Reb-A, color (where used), seeding, cooked syrup, flavor, fat, and citric acid or sweetened condensed milk and salt were added to a mixer and admixed to form a toffee. The toffee was cooled on a cooling table, pulled on a pulling table, and rolled to a thickness of about 10 mm. The rolled toffee was cut to size to form the finished chewy confection.

Figure 5:
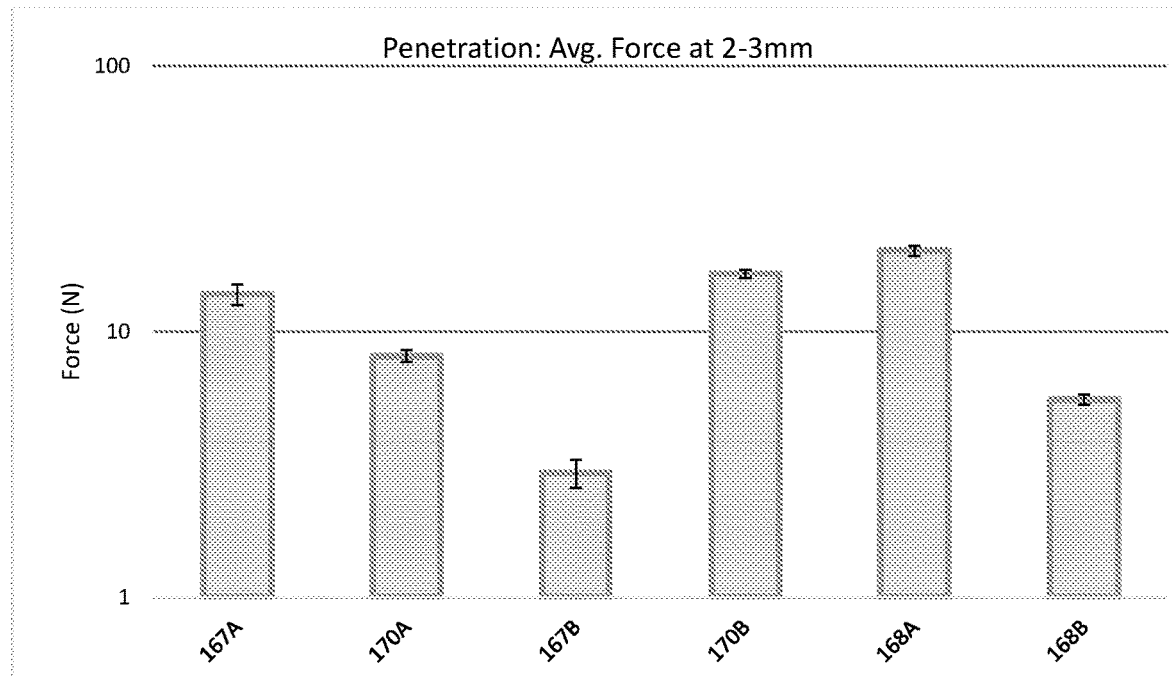
FIGS. 5 and 6 depict Texture Analysis results from penetration and compression testing of the samples provided in Table 8. The average force exerted by the sample on a 2 mm cylindrical probe from 2 to 3 mm penetration depth is shown in FIG. 5, and the forces exerted by uniformly-cut samples on a 2" cylindrical probe at 25%, 50%, and 67% strain are shown in FIG. 6.
Figure 6:
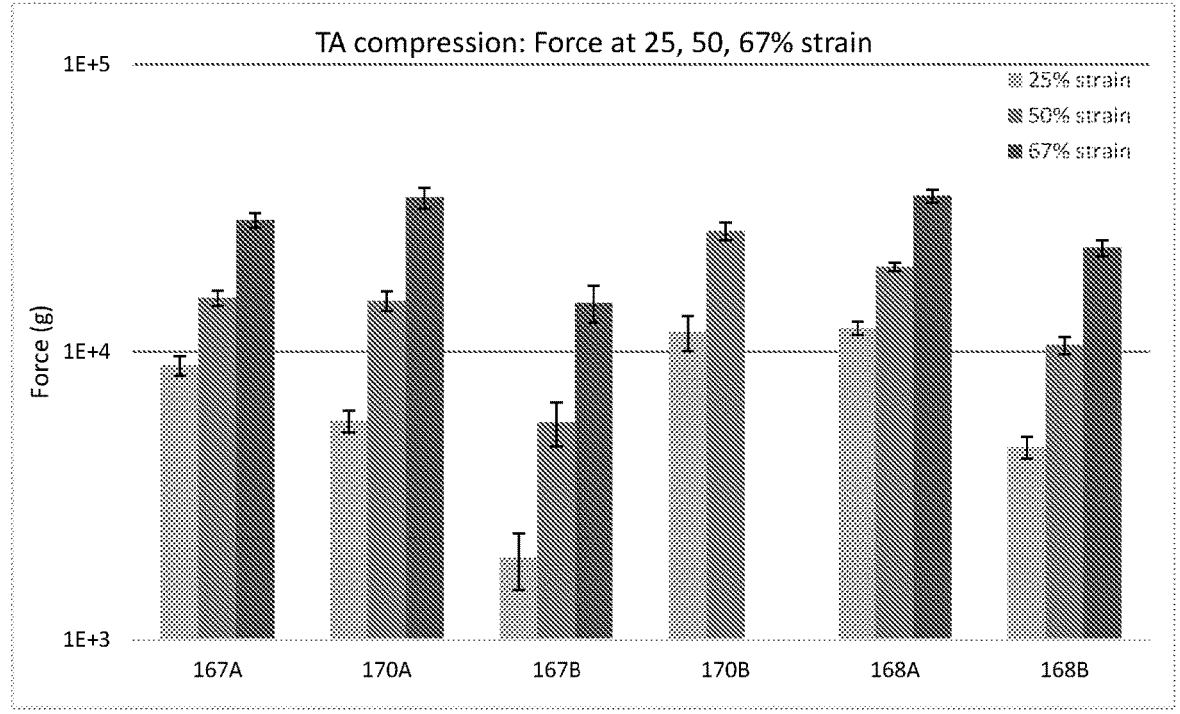

All samples in Table 8 were tested with a texture analyzer under penetration (hardness) and compression (force at % strain); results are reflected in FIGS. 5 and 6. FIG. 5 demonstrates that product hardness is driven by moisture, but also surprisingly, by the level of bulking agents used. Comparing samples with 64/36 Sucromalt/ErOH (167B) vs. 75/25 MVS/ErOH (170B), both have similar moisture content but 170B is harder, showing that the higher proportion of MVS contributes to harder texture. Cooked syrup moistures of experimental samples required adjustment to achieve acceptable (not too firm) textures. In FIG. 6, controls 167A and 168A generally show higher force at lower strain but smaller increase in force as strain increases (weaker dependence of force on strain).

Figure 7:
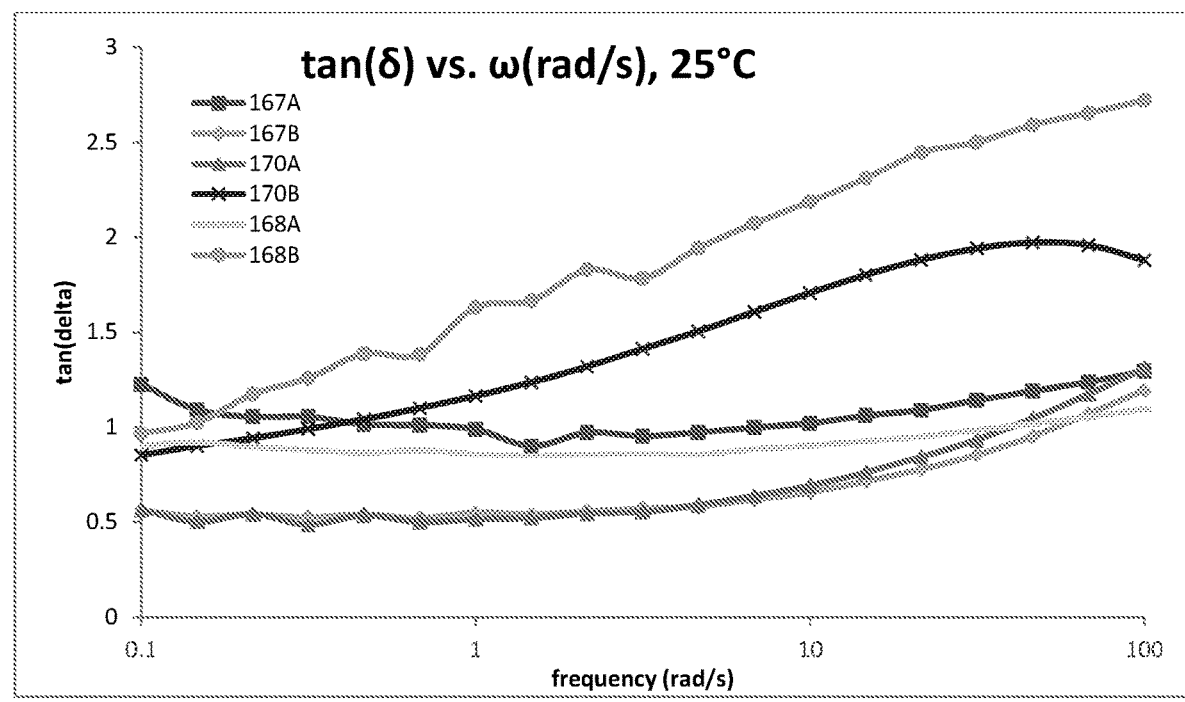
FIG. 7 depicts the Loss Tangent from small amplitude oscillatory frequency sweeps of the samples provided in Table 8.
Figure 8:
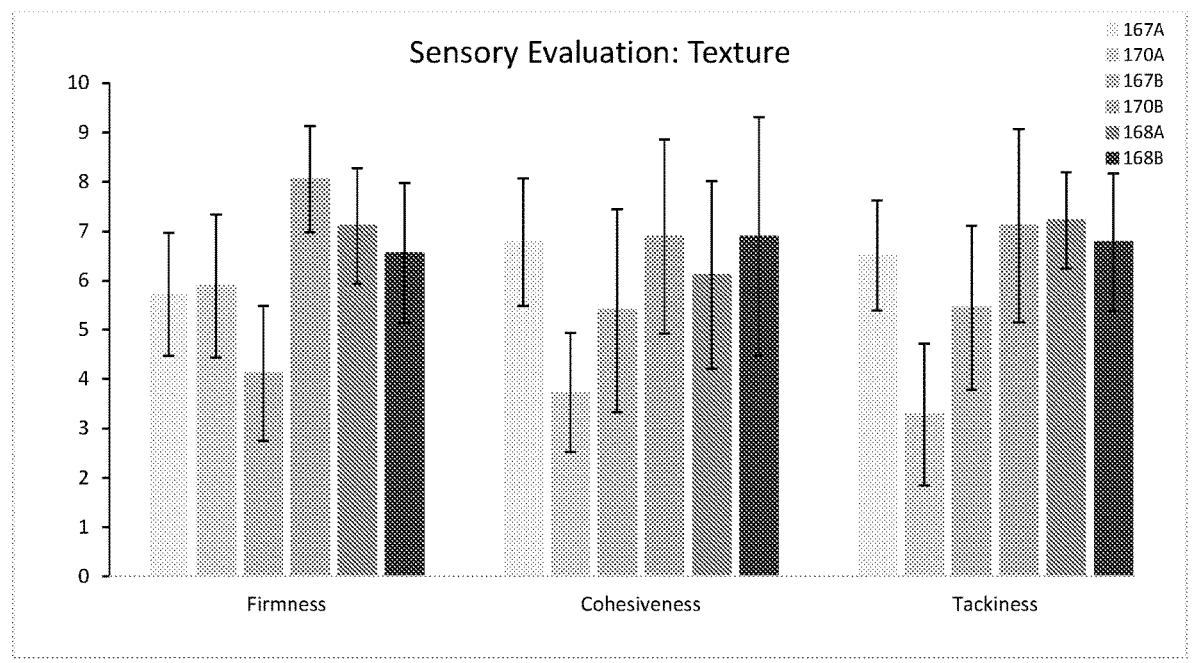
FIG. 8 depicts sensory data reflecting texture (toughness, cohesiveness, tackiness) of the samples provided in table 8.

Selected rheological data as provided in FIG. 7 shows microstructural differences in the samples— Tan (delta) describes the sample's relative viscous or liquid-like nature: higher values relate to samples which more readily disperse energy (more liquid-like) than hold onto it (more solid-like). The experimental sample with 75/25 MVS/ErOH (170B) and the milky experimental (168B) have the highest tan (delta), likely due to high levels of amorphous ingredients counteracting the crystalline nature of erythritol. Interestingly, the two remaining experimental samples with 55/45 MVS/ErOH (170A) and 64/36 MVS/ErOH (168B) have similarly low tan(delta) values. In these cases, the erythritol's crystalline behavior is dominating the microstructure, resulting in a more solid-like behavior than the two controls.

Samples from Table 8 were sensory tested by an internal expert panel (n=9). Sensory assessment shows the 55/45 reduced sugar syrup/ErOH sample had the least cohesion and tack. Panelists also noticed "clean" dissolving, and stronger acid and flavor release from this sample. Also comparing the 64/36 Sucromalt/Erythritol (167B) and 75/25 MVS/Erythritol (170B) samples with similar moisture, the sample with the higher proportion of reduced sugar glucose syrup had the highest perceived firmness, in agreement with the texture results.

The compositions and methods of the present invention are capable of being incorporated in the form of a variety of embodiments, only a few of which have been illustrated and described above. The invention may be embodied in other forms without departing from its spirit or essential characteristics. The described embodiments are to be considered in all aspects only as illustrative and not restrictive, and the scope of the invention, therefore, is indicated by the claims rather than by the foregoing description. All changes which come within the meaning and range of equivalency of the claims are to be embraced within their scope.

What is claimed is:

1. A chewy confection composition comprising:
   (a) a non-cariogenic sweetener comprising erythritol;
   (b) a doctoring agent comprising sucromalt;
   (c) about 8 wt. % fat; and
   (d) about 2 wt. % to about 6 wt. % solids gelling agent,
   wherein a solids weight ratio of doctoring agent to erythritol is from about 1.3:1 to about 2.5:1;
   wherein the composition comprises from about 75 wt % to about 90 wt % doctoring agent and non-cariogenic sweetener solids; and
   wherein the chewy confection has a hardness of about 1.4 kg.

2. The chewy confection composition of claim 1 wherein the solids weight ratio of doctoring agent to erythritol is from about 1.5:1 to about 2.2:1.

3. The chewy confection composition of claim 1 comprising from about 70 wt. % to about 97 wt. % solids.

4. The chewy confection composition of claim 1 wherein the non-cariogenic sweetener consists essentially of erythritol.

5. The chewy confection composition of claim 1 wherein the doctoring agent consists essentially of sucromalt.

6. The chewy confection composition of claim 1 wherein the gelling agent comprises starch.

7. The chewy confection composition of claim 1 wherein the gelling agent further comprises gelatin and dextrin.

8. The chewy confection composition of claim 1 wherein the gelling agent comprises gelatin and gum Arabic.

9. The chewy confection composition of claim 1 comprising about 3 wt % solids gelling agent.

10. The chewy confection composition of claim 1 further comprising from about 0.5 wt. % to about 5 wt. % erythritol seed crystals.

11. The chewy confection composition of claim 1 having a moisture content of from about 6 wt. % to about 7 wt. %.

12. A process for preparing a chewy confection, the process comprising:
   (a) forming an admixture of a doctoring agent comprising sucromalt and a non-cariogenic sweetener comprising erythritol; wherein solids weight ratio of doctoring agent to erythritol is from about 1.3:1 to about 2.5:1;
   (b) heating the admixture to a temperature of about 290° F.;
   (c) mixing the heated doctoring agent and non-cariogenic sweetener with about 8 wt. % fat, about 2 wt. % to about 6 wt. % solids gelling agent, erythritol seed crystals, and flavor to form a chewy confection admixture; and
   (d) forming the chewy confection admixture into the chewy confection;
   wherein the chewy confection comprises from about 75 wt. % to about 90 wt. % doctoring agent and non-cariogenic sweetener solids.

13. The process of claim 12 wherein the solids weight ratio of doctoring agent to erythritol is from about 1.5:1 to about 2.2:1.

14. The process of claim 12 wherein the chewy confection comprises from about 70 wt. % to about 97 wt. % solids.

15. The process of claim 12 wherein the non-cariogenic sweetener consists essentially of erythritol.

16. The process of claim 12 wherein the doctoring agent consists essentially of sucromalt.

17. The process of claim 12 wherein the gelling agent comprises starch.

18. The process of claim 12 wherein the gelling agent further comprises gelatin and dextrin.

19. The process of claim 12 wherein the gelling agent comprises gelatin and gum Arabic.

20. The process of claim 12 wherein the chewy confection comprises, from about 2 wt. % to about 5 wt. % solids gelling agent.

21. The process of claim 12 wherein the chewy confection comprises about 3 wt. % solids gelling agent.

22. The process of claim 12 wherein the chewy confection composition comprises from about 1 wt. % to about 4 wt. % erythritol seed crystals.

* * * * *